(12) United States Patent
Suarez-Rivera et al.

(10) Patent No.: US 8,571,799 B2
(45) Date of Patent: Oct. 29, 2013

(54) METHOD FOR COST EFFECTIVE SAMPLING AND CHARACTERIZATION OF HETEROGENEOUS UNCONVENTIONAL HYDROCARBON REGIONS

(75) Inventors: Roberto Suarez-Rivera, Salt Lake City, UT (US); David Handwerger, Salt Lake City, UT (US); Lars Sonneland, Tananger (NO); Samuel Fluckiger, Salt Lake City, UT (US); Mary Milner, Salt Lake City, UT (US); Douglas Ekart, Salt Lake City, UT (US)

(73) Assignee: Schlumberger Technology Corporation, Sugar Land, TX (US)

( * ) Notice: Subject to any disclaimer, the term of this patent is extended or adjusted under 35 U.S.C. 154(b) by 339 days.

(21) Appl. No.: 13/158,270

(22) Filed: Jun. 10, 2011

(65) Prior Publication Data

US 2012/0316789 A1 Dec. 13, 2012

(51) Int. Cl.
*G06F 19/00* (2011.01)

(52) U.S. Cl.
USPC ........... 702/13; 702/2; 702/8; 702/9; 702/10; 702/11; 702/12; 702/16; 703/2; 703/5; 703/6; 703/7; 703/10; 367/31; 367/73

(58) Field of Classification Search
USPC ........ 702/2, 8, 9, 10, 11, 12, 13, 16; 703/2, 5, 703/6, 7, 10; 367/31, 73
See application file for complete search history.

(56) References Cited

U.S. PATENT DOCUMENTS

| | | | | |
|---|---|---|---|---|
| 5,583,825 A * | 12/1996 | Carrazzone et al. | ............ | 367/31 |
| 6,438,493 B1 * | 8/2002 | West et al. | ........................ | 702/2 |
| 6,950,786 B1 * | 9/2005 | Sonneland et al. | ............... | 703/2 |
| 6,970,397 B2 * | 11/2005 | Castagna et al. | ................ | 367/73 |
| 7,660,774 B2 * | 2/2010 | Mukherjee et al. | ............. | 706/20 |
| 8,200,465 B2 * | 6/2012 | Suarez-Rivera et al. | ........ | 703/10 |
| 8,261,319 B2 * | 9/2012 | Libin et al. | ........................ | 726/2 |
| 2007/0168133 A1 * | 7/2007 | Bennett et al. | .................... | 702/6 |
| 2008/0068928 A1 * | 3/2008 | Duncan et al. | ................. | 367/73 |
| 2008/0156975 A1 | 7/2008 | Kieschnick | | |
| 2008/0162098 A1 | 7/2008 | Suarez-Rivera et al. | | |
| 2009/0103677 A1 * | 4/2009 | Wood et al. | ..................... | 378/53 |
| 2009/0187391 A1 * | 7/2009 | Wendt et al. | ...................... | 703/7 |
| 2009/0260415 A1 | 10/2009 | Suarez-Rivera et al. | | |
| 2009/0260883 A1 | 10/2009 | Suarez-Rivera et al. | | |
| 2009/0306895 A1 * | 12/2009 | MacGregor et al. | ............. | 702/6 |
| 2009/0319243 A1 * | 12/2009 | Suarez-Rivera et al. | ........ | 703/10 |
| 2012/0016592 A1 * | 1/2012 | Artman et al. | ................. | 702/16 |
| 2013/0046524 A1 * | 2/2013 | Gathogo et al. | .................. | 703/6 |
| 2013/0090902 A1 * | 4/2013 | Yao et al. | .......................... | 703/2 |

FOREIGN PATENT DOCUMENTS

WO WO 9741456 A1 * 11/1997
WO WO2011/073861 A2 6/2011

* cited by examiner

*Primary Examiner* — Carol S Tsai
(74) *Attorney, Agent, or Firm* — Robert A. Van Someren; Wayne I. Kanak

(57) ABSTRACT

A methodology improves sampling and characterization of heterogeneous, unconventional hydrocarbon-bearing regions. The methodology is designed to integrate consistently across measurements and scales. Additionally, the methodology involves characterizing various scales, such as regional-scale heterogeneity, wellbore-scale heterogeneity, core-scale heterogeneity, sample-scale, and pore-scale heterogeneity. The results are integrated across the multiple scales based on results obtained from the characterization of the scales. The methodology further comprises determining data propagation across the multiple scales in a hydrocarbon-bearing region.

18 Claims, 11 Drawing Sheets
(7 of 11 Drawing Sheet(s) Filed in Color)

METHOD FOR COST EFFECTIVE SAMPLING AND CHARACTERIZATION OF HETEROGENEOUS UNCONVENTIONAL HYDROCARBON REGIONS

BACKGROUND OF THE INVENTION

Regional scale reservoir characterization is traditionally conducted using predominantly seismic and well log data. Additionally, well locations are selected for coring and comprehensive laboratory analysis of the cored reservoir sections. Seismic characterization focuses on identification of lithologic boundaries (seismic reflectors) which define the reservoir units and its boundaries. The seismic data is then processed to identify distribution of relevant geometric and material properties, e.g. curvature, fault identification, elastic moduli, and density, and to infer changes in inferred reservoir properties, e.g. porosity and lithology. Results are used to identify the volume of the reserves and the economic potential of the reservoir. Similarly, well log data and core data are used to constrain the seismic interpretation and provide calibrations for evaluation of the inferred properties.

Traditional interpretations of the well log data provide means for identifying and correlating lithologic bed boundaries and tracking the top and bottom boundaries of the reservoir with higher resolution. In traditional methods, the well log data is also used for interpretation of the mineralogy, bulk density, and porosity of each of the lithologies of interest, while also providing information on pore fluid types and saturations. The results provide a higher resolution evaluation of the reservoir size (number of wells) and the reservoir potential. The results also provide input for constructing and validating the geologic depositional model.

Traditionally, rock physics models of each of the dominant lithologic units, and of the reservoir unit, are developed. However, this type of modeling requires some level of homogenization of all measured properties, typically accomplished using effective media. The modeling further requires a test of consistency between all measurements, to assess model validity. For example, rock physics models allow comparisons of wave velocity without the pore fluid effect (dry rock) and, based on this comparison, the velocity of various lithologies can be determined without the effect imposed by the possibly varying pore fluid types and the pore fluid saturations. These models also provide synthetic seismic traces, i.e. numerically computed, for comparison and model validation with respect to measured seismic traces. In traditional modeling, reservoir heterogeneity exists at the lithologic bed scale, and within this scale all properties and model parameters are homogenized. Furthermore, material properties, results from parametric models, and correlations are applied laterally following the geometry of the well defined lithologic units. In brief, these traditional methods make assumptions that appear reasonable for conventional reservoirs but are unreasonable for the conditions of unconventional reservoirs.

Limitations of this traditional methodology arise when the lithologic unit is no longer the proper scale for homogenization, and this has strong implications for sampling and characterization. Methods and procedures for recognizing variability within assumed homogeneous lithologic units have been proposed, but these methods only refine the vertical resolution of the model while maintaining the assumption of lateral continuity. As explained in the following discussion, lateral continuity is a poor assumption for fine size sediments, e.g. organic-rich mudstones and fine carbonates, subjected to strong diagenetic transformations.

The dominant drivers of post-depositional transformations in organic-rich mudstones and similar systems arise from the colloidal size of the sediments, which have high surface area and high associated surface energy that promote geochemical interactions, the mixture of mineral and organic components from multiple origins and sources (terrigenous and biogenic), and from the interaction of the latter with living organisms, e.g. microorganisms that supply biogenic minerals and bacteria that feed on the deposited organic matter, both promoting a complex chain of geochemical interactions.

The effects of diagenesis in conventional, e.g. larger size, sediments are typically limited to the development of cementation and the associated reduction in porosity. This effect is limited because geochemical reactions are surface controlled, and the available surface area is relatively small. The magnitude of the surface area in the colloidal-size sediments in organic-rich mudstones is orders of magnitude larger than that of conventional reservoirs, and the geochemical interaction between their organic and inorganic components is very high. In addition, important interactions with living organisms that supply biogenic minerals metabolize the original organic matter and trigger additional geochemical transformations that do not occur homogeneously across the basin. These living organisms have particular needs and preferences regarding food supply, environment, water depth, and temperature, and thus their presence and distribution is predominantly local and changes with time. Diagenetic transformations create fundamental changes in the texture and remineralization (composition) of the original system, and develop material properties that fundamentally affect the conditions of reservoir quality (RQ) and completion quality (CQ). Most importantly, these changes are localized in time and areal extent. For example, the precipitation of biogenic silicon supplied by the silicon rich skeletons of microorganisms, if dissolved and percolated within the clay structure at the right time and prior to compaction of the sediments, results in silica strengthening of the matrix, and a matrix texture that supports high porosity and a high degree of pore interconnectivity.

Additionally, the combination of diagenetic transformations must preserve the right type, amount, and degree of degradation of organic matter in the pore space, for subsequent thermal maturation into hydrocarbons. Because the degradation of organic matter, often promoted by microbial activity, results in changes in the chemical environment, as well as the releasing of elements that promote inorganic reactions, the geochemical cycle is a complex one. Important end products result from the coincidental convergence of the right conditions of time and the presence of the right combinations of mineral and organic components undergoing specific diagenetic transformations. Since these conditions are only satisfied locally, changes in texture and composition result in the development of local regions with high reservoir and completion qualities. It is because of these complex and heterogeneous post-depositional transformations, that properties, concepts, and data correlations cannot be propagated laterally across lithologic or sub-lithologic units in organic rich mudstone systems, even when the depositional system appears to be simple. This condition needs to be well understood before any data and knowledge derived from such data can be laterally propagated across the system. Unfortunately, there is no current methodology that addresses this problem in a consistent, quantitative, and non-subjective manner. Important questions on how to obtain representative sampling in vertically and laterally heterogeneous systems, how to represent the entire system, and how to scale from small observations to the larger system behavior are still challenging. In addition, the above challenges have profound implications in the development of models, population of properties across these models, and in predicting and forecasting. The present invention solves these limitations and satisfies these needs.

BRIEF SUMMARY OF THE INVENTION

In general, the present invention provides for improved sampling and characterization of heterogeneous, unconventional hydrocarbon-bearing regions. The methodology is able to integrate consistently across the measurements and across scales. The methodology involves characterizing heterogeneity at various scales, such as regional-scale, wellbore-scale, core-scale, sample-scale, and pore-scale. The results are integrated across the multiple scales based on measurements obtained at various scales. The methodology further comprises the interpolation of data across similar scales and across the multiple scales in a hydrocarbon-bearing region.

BRIEF DESCRIPTION OF THE DRAWINGS

The patent or application file contains at least one drawing executed in color. Copies of this patent or patent application publication with color drawing(s) will be provided by the Office upon request and payment of the necessary fee. Certain embodiments of the invention will hereafter be described with reference to the accompanying drawings, wherein like reference numerals denote like elements, and.

DETAILED DESCRIPTION OF THE INVENTION

Figure 1:
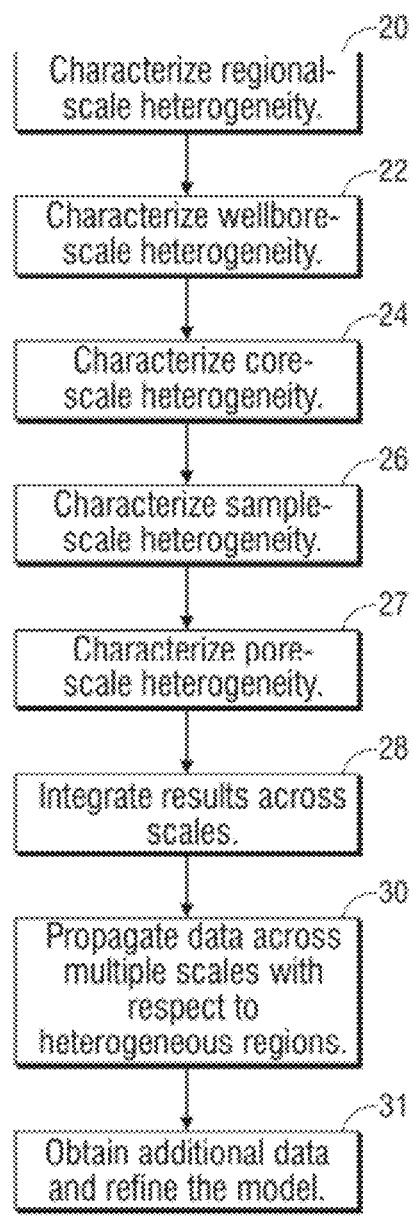
FIG. 1 is a flowchart illustrating an example of a method for characterizing a heterogeneous subterranean region, such as a hydrocarbon-bearing basin.

In the following description, numerous details are set forth to provide an understanding of the present invention. However, it will be understood by those of ordinary skill in the art that the present invention may be practiced without these details and that numerous variations or modifications from the described embodiments may be possible.

The present invention generally relates to a methodology for integrated, consistent, and effective sampling, and for characterization across multiple scales of heterogeneous hydrocarbon plays, i.e. heterogeneous subterranean regions containing hydrocarbons. The methodology also enables strategic pre-planning and updating of the sampling strategy based on criteria which provide maximum representation, minimum redundancy, maximum cost-effectiveness, and minimum risk.

According to an embodiment of the present invention, the methodology integrates; consistently and effectively samples across multiple scales; and addresses the unified characterization of geologic, petrologic, geochemical, petrophysical, fluid, and mechanical properties of heterogeneous regions, including reservoir and non-reservoir rocks, across multiple scales (from pore-scale to seismic-scale). The methodology defines the sampling strategy for effective characterization of the heterogeneous region and facilitates strategic pre-planning and updating of the strategy based on criteria of maximum representation, minimum redundancy, maximum cost-effectiveness, and minimum risk. The method may be updated anytime additional information (e.g. additional measurements) is available, and provides updated recommendations for effective sampling and characterization during the life of a given region or field. Based on the degree of certainty required for regional characterization of material properties, the methodology provides quantitative volumetric assessment of the percent of the hydrocarbon play (volumetric region) that is well characterized and the percent of the play that is poorly characterized. This information is used to evaluate the value (cost and risk minimization) of additional characterization and also facilitates the cost/benefit and cost/risk assessments of the additional information.

Characterization of hydrocarbon play properties for exploration and production may be obtained via seismic inversions, well log inversions, and direct measurements on cores, including pore-scale petrologic imaging and visualization. The methodology for effective characterization of conventional hydrocarbon plays has been refined over many years, but the methodology for effective sampling and characterization of unconventional hydrocarbon plays, e.g. oil and gas producing tight shales, heavy oil, other unconventional subterranean regions was, until now, undefined and problematic. Conventional reservoirs are reasonably homogeneous and continuous at their stratigraphic, depositional scale. In other words, a particular lithologic unit, e.g. a reservoir sand, tends to have reasonably well constrained set of properties along its vertical and lateral extent.

In unconventional reservoirs, such as in organic-rich mudstones, strong post-depositional processes of diagenesis and bioturbation (which are enhanced by the colloidal sediment size and high surface to volume ratio of these sediments) develop considerably higher and more localized heterogeneity. In these unconventional, heterogeneous regions, substantial changes in properties are measured even within well defined lithologic units. With unconventional reservoirs, important changes in material properties within the same lithologic unit result in only subtle variability in log responses or seismic responses, and thus specialized log and seismic analyses as required to identify these changes. Visual core inspection by itself is inadequate for evaluating the high degree of variability in properties along the length of core sections that are visually homogeneous. The present methodology uses high resolution and continuous measurements along the length of the core to measure, define, map, and understand this variability in properties at core-scale. Basically, for a system that is heterogeneous, the invention provides a methodology for identifying and mapping this heterogeneity. This is done based on measurements without making any assumptions based in geology. Traditional methods start by making assumptions of homogeneity or heterogeneity based on some level of understanding of the geologic system. The important and misleading assumption has been that depositionally homogeneous lithologies host a homogeneous, well constrained set of material properties.

The embodiments described herein define both the methodology and desired measurements for characterization of heterogeneous, unconventional subterranean regions, including reservoir and non-reservoir rocks, via measurements obtained at multiple scales and via consistent integration of laboratory measurements on core material. Application of the methodology involves characterization of rock heterogeneity at a regional-scale (e.g. through seismic techniques); at a wellbore-scale (e.g. through logs); at a core-scale (e.g. through continuous property profiles); at a sample-scale (laboratory testing), and at pore-scale (e.g. through scanning electron microscopy (SEM) images). However, aspects of the methodology may also be conducted with limited available data, such as data based on preliminary seismic data, limited well log data, or drill cuttings or rock fragments. The methodology may also be carried out prior to drilling, for example, for the selection of pilot hole locations, core lengths (or rotary sidewall plug (RSWP) depth selection), simultaneously with drilling (for RSWP depth selection and collection in real-time, real-time analysis of reservoir quality and completion quality along horizontal wells), or after drilling (for additional RSWP sampling, or characterization with logging and integration to seismic).

Referring generally to FIG. 1, an embodiment of the methodology is illustrated, which uses consistent numerical and statistical techniques for identification of rock classes within the regional-scale heterogeneous system, that are seen as homogeneous by measurements at the seismic-scale, wellbore-scale, core-scale, and pore-scale. For example, a rock class that is defined as homogeneous at the wellbore-scale, because of the resolution of the measurement, may be broken down in additional homogeneous sub-classes based on measurements at the core-scale. The consistent numerical methodology enables the user to scale up and scale down without losing information of the variability observed at the different scales. FIG. 1 provides a flowchart which illustrates one embodiment of the methodology described herein for providing cost effective sampling and characterization of heterogeneous, unconventional hydrocarbon regions.

Initially, a regional-scale heterogeneity characterization is conducted on regional-scale data (e.g., seismic, gravity, cross-well tomography or the like) or inferences are drawn from regional-scale geologic models and understanding. The goal may involve an assessment of the regional-scale heterogeneity for defining pilot well locations for specialized well logging and coring, as represented by block 20 in FIG. 1. The methodology further comprises wellbore-scale heterogeneity characterization which may involve the assessment of optimal selection of core sections and core depths, as represented by block 22. Additionally, a core-scale heterogeneity characterization is performed, as represented by block 24. The core-scale heterogeneity characterization may be based on high resolution, continuous measurements along the length of the core (for example, strength, surface hardness, surface acoustic velocity, thermal properties, mineralogy, x-ray computer tomography (CT) density, color, and the like). The goal of this portion of the method may also involve the assessment of optimal selection of samples for laboratory testing, which are also compatible with the larger scale system (wellbore-scale, regional-scale).

As further illustrated in FIG. 1, the methodology further comprises characterization of sample-scale and pore-scale heterogeneities, as represented by blocks 26 and 27. The sample-scale heterogeneity characterization is conducted with, for example, the highest resolution continuous measurements and large format thin section digital imaging. The goal of the characterization may involve the assessment of optimal selection of samples for pore-scale evaluation through, for example, scanning electron microscopy (SEM) or argon milling imaging, or tests conducted with probes inside an SEM system. The pore-scale evaluation uses analysis of small scale digital images (for example thin section, SEM, and composite images constructed by the stitching of a large number of high-magnification SEM images). The mathematical analysis may include running the Ant Tracking algorithm, available from Schlumberger Technology Corporation of Sugar Land, Tex., USA, on the images to quantify dominant textural features. The goal of the characterization may involve the association of particular micro-fabrics with the results of the assessment at this scale, as indicated above. The method further involves integration of results across scales, e.g. across the regional, wellbore, core, sample and pore scales, as represented by block 28. The data collected may be propagated across multiple scales in heterogeneous regions, e.g. up-scaling, as represented by block 30. The methodology also comprises the cycle of obtaining additional data and refining the model based on the additional data, as represented by block 31.

Figure 2:
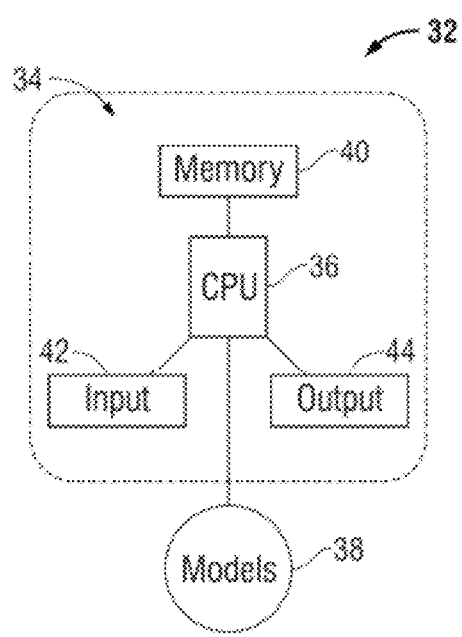
FIG. 2 is a schematic illustration of processing system which may be used to process data and/or to run models for characterizing the heterogeneous subterranean region.

In this particular example, the various data collected may be input and processed on a processor-based system 32, as illustrated schematically in FIG. 2. Additionally, the data may be used to construct models and/or may be subjected to modeling on the processor-based system 32. By way of example, the processor-based system 32 may be employed to run Heterogeneous Rock Analysis (HRA) models and/or Heterogeneous Earth Modeling (HEM) and/or image processing, or Ant Tracking mathematical models, to facilitate application of the methodology described herein. Some or all of the methodology outlined with reference to FIG. 1 and also with reference to FIGS. 3-14 (described below) may be carried out by processor-based system 32. In this example, processor-based system 32 comprises an automated system 34 designed to automatically perform the desired data processing.

The processor-based system 32 may be in the form of a computer-based system having a processor 36, such as a central processing unit (CPU). The processor 36 is operatively employed to intake data, process data, and run various models 38, e.g. HRA and HEM models. The processor 36 may also be operatively coupled with a memory 40, an input device 42, and an output device 44. Input device 42 may comprise a variety of devices, such as a keyboard, mouse, voice recognition unit, touchscreen, other input devices, or combinations of such devices. Output device 44 may comprise a visual and/or audio output device, such as a computer display, monitor, or other display medium having a graphical user interface. Additionally, the processing may be done on a single device or multiple devices on location, away from the reservoir location, or with some devices located on location and other devices located remotely. Once the desired modeling and other programming is constructed based on the desired characterization of heterogeneous, unconventional hydrocarbon regions, the characterization data and the results obtained may be stored in memory 40.

Characterization of regional-scale heterogeneity may be conducted on either 2D or 3D regional-scale data (e.g. seismic data). However, this characterization may also be conducted on 3D or 2D gravity or other regional-scale data. Sometimes, the characterization may utilize micro-seismic data. When wellbore-scale data exists (the data may comprise wireline logs, mud log data, mud gas logging data, such as from the FLAIR system available from Schlumberger Technology Corporation, or drill cuttings data, for example), this data is integrated with the regional-scale data for more adequate characterization of rock classes. Wellbore-scale data may comprise well log data, although other types of wellbore-scale data can be used alone or in combination with well log data. For example, the data may include regularly spaced drill cuttings data having good depth control or origin. Wellbore-scale data is useful when intimately integrated with core data and associated with laboratory measurements and analyses. For initial analysis, use of seismic data of reasonable quality and resolution in combination with well log data from a single well (or multiple wells if available) combined and integrated with core or drill cuttings data may be highly desirable. As additional data becomes available during appraisal, exploration, and development, the additional data may be used to update and refine the regional model and the sampling requirements. Thus, the development of the Heterogeneous Earth Model and the associated sampling requirement recommendations are intrinsically tied to each other. For example, a more homogeneous system may have lower sampling requirements while a less homogeneous system may have higher sampling requirements.

Figure 3:
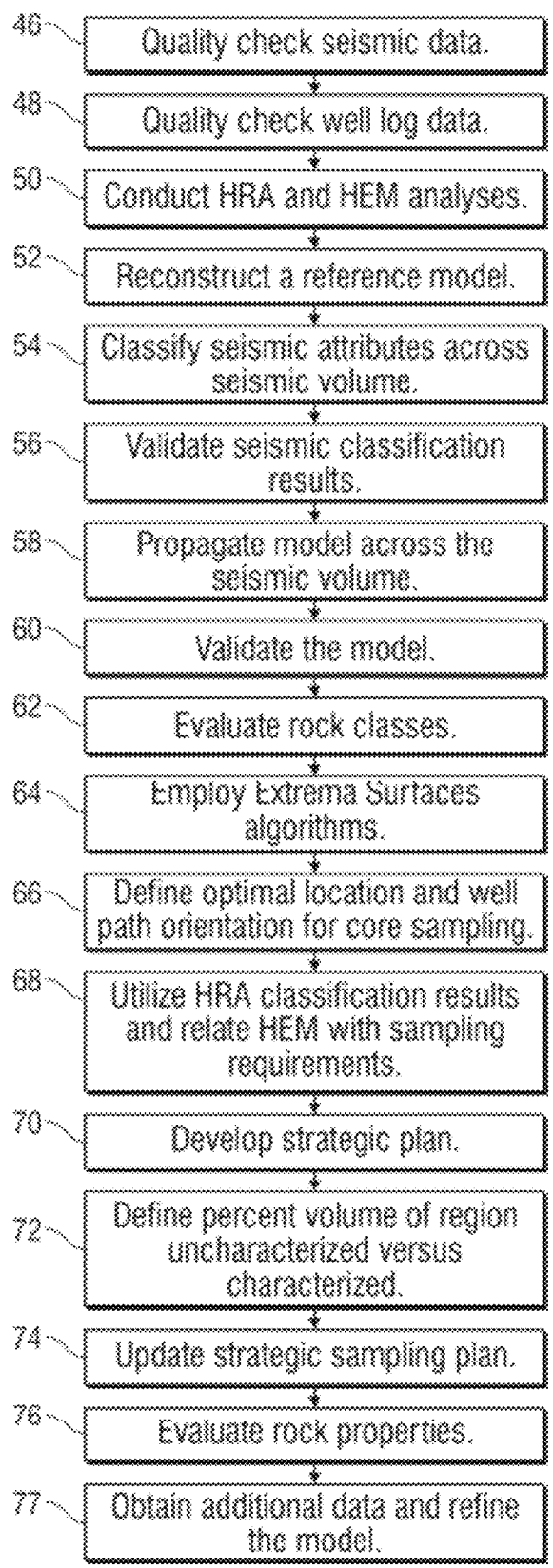
FIG. 3 is a flowchart illustrating a more detailed example of characterizing regional-scale heterogeneity.

Referring generally to FIG. 3, a flowchart is provided as an example of one methodology for characterizing regional-scale heterogeneity which may include assessment of pilot well locations. Rock classification at the seismic-scale may be conducted according to the methodological example provided in FIG. 3. In this embodiment, seismic data is initially quality checked and processed, as indicated by block 46. The seismic data may be processed according to industry standard procedures in which the results provide seismic attributes, e.g. Vp, Vs, acoustic frequency, acoustic amplitudes, bulk density, and other attributes, defined across the volume subjected to seismic evaluation. Well log data from wells intersecting the seismic cube also may be quality checked and environmentally corrected, as indicated by block 48. Various analyses may be conducted, e.g. Heterogeneous Rock Analysis (HRA) and Heterogeneous Earth Modeling (HEM), to define a consistent rock classes reference set for the region, as indicated by block 50. One example of such an analysis is described in US Patent Application Publication US 2009/0319243 A1.

The HRA results are reprocessed and a reference model is reconstructed using logs at reduced resolution (e.g. log-scale data reduced to equivalent seismic scale), as indicated by block 52. Correspondence between the original rock classes and the reduced resolution rock classes is defined. This relationship can be important for populating properties across the regional-scale model. The reduced resolution reference model may also be used to conduct the supervised classification of seismic attributes across the seismic volume, as indicated by block 54. The seismic classification results may be validated by comparison to the reduced resolution HRA from individual wells, as indicated by block 56. For example, low resolution HRA results of a well removed from a training set can be compared to classification results at the well location in the seismic cube.

Once the reference rock class model is developed at seismic-scale, this is propagated across the seismic volume, as indicated by block 58. Propagation of the model across the seismic volume may be achieved using a Spatial Markov Field, to add constraints based on probabilities of rock class vertical stacking patterns obtained from training wells. Thus, as the number of wells increase in the play, the quality of the constraints and the definitions of the rock classes improve. The model is then validated by comparing final classified cubes from different realizations to each other and by computing error maps to define the degree of confidence across the model, as indicated by block 60. The rock classes are evaluated, as indicated by block 62. It should be noted that rock classes defined at seismic resolution are lower resolution classes which may incorporate one or more sub-classes defined at well-scale resolution. Thus, a rock class which is uniquely defined at regional-scale, based on seismic data, and considered to be homogeneous at this scale, may subsequently be observed as heterogeneous with higher resolution log measurements. This allows the rock class to be broken down into rock sub-classes which are considered to be homogeneous at the well-scale resolution.

The methodology for characterizing regional-scale heterogeneity may also employ Extrema Surfaces algorithms, as indicated by block 64. The Extrema Surfaces algorithms, such as ExtremaSG software available from Schlumberger Technology Corporation, are used to define the lateral extent and continuity of each of the rock classes and to define the volumes of each rock class across the region. The resulting volumetric distribution of rock classes can be used to define the optimal location and optimal well path orientation for core sampling, as indicated by block 66. One objective may be to maximize the representation of variability in rock classes with a core while minimizing the number of well locations and cores required for complete representation of all the different rock classes identified by the analysis. In other words, representation of the variability is maximized with minimum cost and effort.

The methodology does not make assumptions based on laterally continuous geologic facies, however the methodology utilizes the HRA classification results and intimately relates the Heterogeneous Earth Model with the sampling requirements, as indicated by block 68. As a consequence, a homogeneous model will have fewer sampling requirements than the heterogeneous model. The samples are located based on the variability in rock classes instead of on assumptions of a laterally uniform depositional system.

Based on the data obtained, a strategic plan is developed, as indicated by block 70. The strategic plan provides a hierarchical order of importance for sampling across the region. It should be noted that strategic planning, after a complete seismic-scale characterization of heterogeneity across the region, has to do with decisions on how to characterize the system, how to take representative samples, how many pilot wells to drill, and how many core sections to take. The methodology allows one to answer these questions quantitatively and to provide a solution that is the most effective in maximizing representation of the variability with the minimum effort. However, practical concerns or financial limitations may define more limited goals. By comparing the volume of the overall system, versus the volume of the rock classes that are sampled and characterized, versus the ones that are not sampled and left uncharacterized, the consequences of these decisions may be evaluated, as represented by block 72. The strategic plan is also concerned with how to optimize these decisions, and minimize risk, or maximize value. Furthermore, if the system is in reality composed by, for example, ten dominant rock classes but the well log(s) used to develop the seismic log reference model only sample five of these classes, the additional rock classes may or may not be detectable or well discriminated. Thus, a considerable error and confusion of the system heterogeneity may still remain and this becomes part of the strategic planning considerations.

Given the strategic planning, as defined above, the percent volume of the rock in the region analyzed is compared with the percent volume of the various rock classes defined by the analysis, and the percent volume of the various rock classes that will be sampled and characterized is then defined (see block 72). The analysis also includes an assessment of the error associated in the rock classification (as indicated above) and thus of their volumetric assessment. Defining this analysis of percent rock class volume may be accomplished using the reference seismic model (developed by supervised classification on reference-based log data from multiple wells) and computing the error between the definitions of the seismic attributes for each rock class in the model and the seismic attributes across the entire region. Locations with low error are well represented by the reference model, locations with high error are poorly represented by the reference model (e.g., may include rock classes that are not yet identified). The results facilitate assessment of the cost/benefit and cost/risk of obtaining additional information through, for example, additional vertical pilot holes, seismic data, logs, cores, and other approaches.

The strategic sampling plan may be continually updated, as indicated by block 74. The strategic sampling plan and the cost/benefit and risk reduction assessment are based on criteria of maximum representation, minimum redundancy, maximum cost effectiveness, and minimum risk. The strategic plan may be updated every time additional information is available through, for example, drill cuttings, cores, logs, new pilot holes, additional seismic data, or other information. The information is employed to evaluate rock properties, as indicated by block 76. For example, the acquired information and known rock properties (e.g. from HRA and HEM processes) may be used to evaluate mechanical properties and completion quality potential of the region, including the distribution of rock classes that are favorable for fracture height growth containment. The information and rock properties may also be used to evaluate rock classes that promote fracture complexity. Additionally, the information and rock properties may be used to evaluate rock classes that are most prone to mechanical and/or chemical degradation, e.g. rock-fluid interactions, enhanced proppant embedment, solids production during hydrocarbon production, high drawdown, and other potentially detrimental effects. The methodology illustrated in FIG. 3 further comprises the cycle of obtaining additional data and refining the model based on the additional data, as represented by block 77. It should be noted that the processor-based system 32 is useful in performing the data analysis and modeling.

Figure 4:
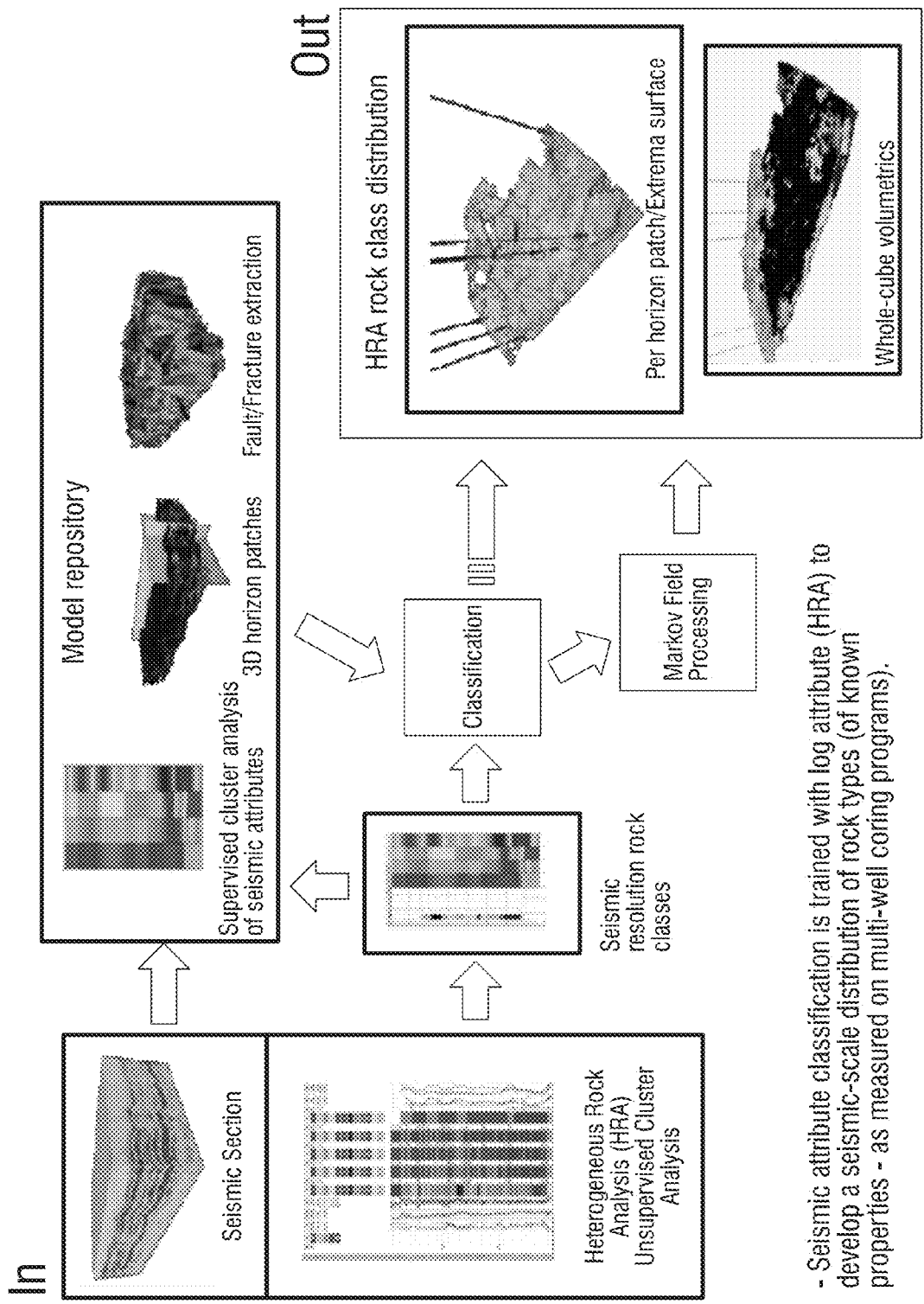
FIG. 4 is a diagram illustrating seismic-scale rock classes.

In FIG. 4, a diagram is provided which illustrates an example of defining seismic-scale rock classes, i.e. seismic-scale diagenetic geobodies. The definition of seismic-scale rock classes may be based on cluster analysis of seismic attributes, e.g. Vp, Vs, acoustic frequency, acoustic amplitudes, bulk density, and others, which is supervised to satisfy rock class definitions obtained from cluster analysis of bulk log responses, the latter reduced to seismic resolution. As discussed above, propagation of the model across the seismic volume may be accomplished using a Spatial Markov Field, as illustrated in FIG. 4, to add constraints based on prior probabilities of rock class vertical stacking patterns. The probabilities may be based on data obtained from training wells. The larger the number of wells and the higher the representation of the stacking patterns between rock classes, the better the constraints for the seismic scale model.

The foundation of the overall methodology is wellbore-scale heterogeneity characterization which may include the selection of core sections and core depths. Characterization of wellbore-scale heterogeneity may be conducted by using HRA on well log data and by defining a regional-wide reference Heterogeneous Earth Model. The wellbore-scale heterogeneity characterization may comprise a pre-drill or real-time HRA assessment and selection of RSWP for laboratory characterization. The characterization may also comprise log-based HRA or drill cuttings-based analysis for rock classification and core depth selection. The characterization process may involve a single well or a multi-well HRA application, and selection of core sections and core locations may be conducted using HRA-based models. Additionally, selection of RSWP for laboratory testing may employ HRA-based models, and selection of intervals for perforating and fracturing may also utilize HRA-based models.

Figure 5:
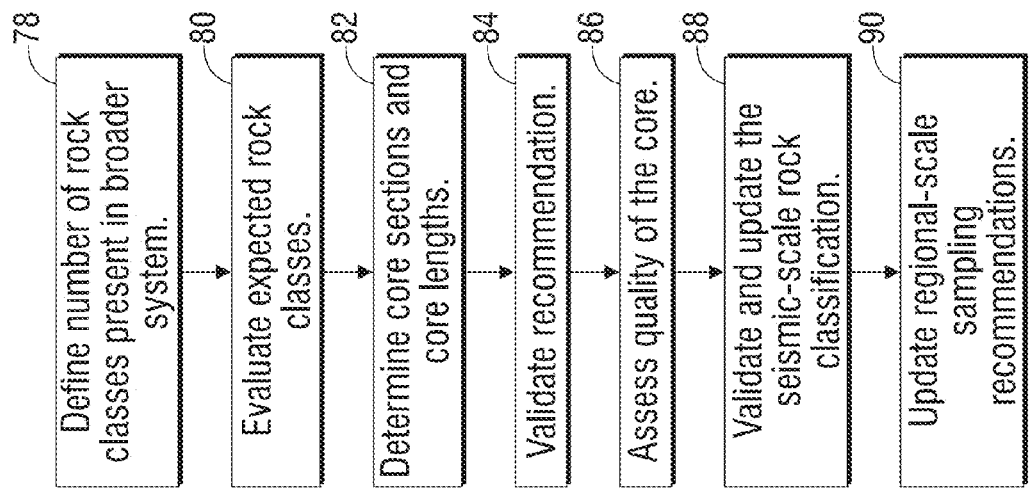
FIG. 5 is a flowchart illustrating a more detailed example of characterizing wellbore-scale heterogeneity.

An example of a process for wellbore-scale heterogeneity characterization is illustrated in the flowchart of FIG. 5. In this embodiment, the methodology initially comprises defining the number of rock classes present in the broader system, as represented by block 78. Defining the number of rock classes may employ the use of a single well HRA or a multi-well reference model (e.g. HEM). The methodology further comprises evaluating expected rock classes, as represented by block 80. For example, HRA results of a wellbore or of multiple wells in close proximity to the recommended location for the pilot well may be used to evaluate the expected rock classes and their stacking patterns and thicknesses. If available, seismic data may be used to gain a better understanding of the lateral distribution from the known wells to the pilot well locations.

The information gained is processed to enable a decision regarding the core sections and core lengths, as indicated by block 82. The information may also be used to maximize representation of the various rock classes along reasonably thick intervals (avoiding thin transitional sections) while minimizing redundancy and minimizing core length. The rock classes selected for sampling have high compliance and minimal error with respect to a reference model. For long intervals, multiple core sections may be utilized. The core recommendation is validated, as indicated by block 84. For example, the methodology may include validating the recommendation using HRA on the cored well (after coring and logging). The results may be used to update the HEM, to validate the recommendation, to supplement the coring effort via RSWP, if necessary, and/or to change the sampling strategy for future wells.

Additionally, the methodology may include assessing the quality of the core, as indicated by block 86. Quality of the core may be assessed along the various rock class sections and the regional scale sampling requirements may be updated based on the information gained. Core sections of poor quality, e.g. sections having high fluid invasion, a high degree of fracturing and poker chipping, or a rubberized portion, can be sampled again on a subsequent pilot well at a different location. The methodology further comprises validating and updating the seismic-scale rock classification with the additional data, as indicated by block 88. Furthermore, the methodology may comprise updating regional-scale sampling recommendations, as indicated by block 90. In some applications, the regional-scale sampling recommendation may be updated, and the percent volume of the hydrocarbon region that is characterized versus the total volume of the region may be recomputed. This action facilitates assessment of the cost/benefit and cost/risk of obtaining additional information through, for example, additional vertical pilot holes, seismic data, logs, cores, or other techniques.

Figure 6:
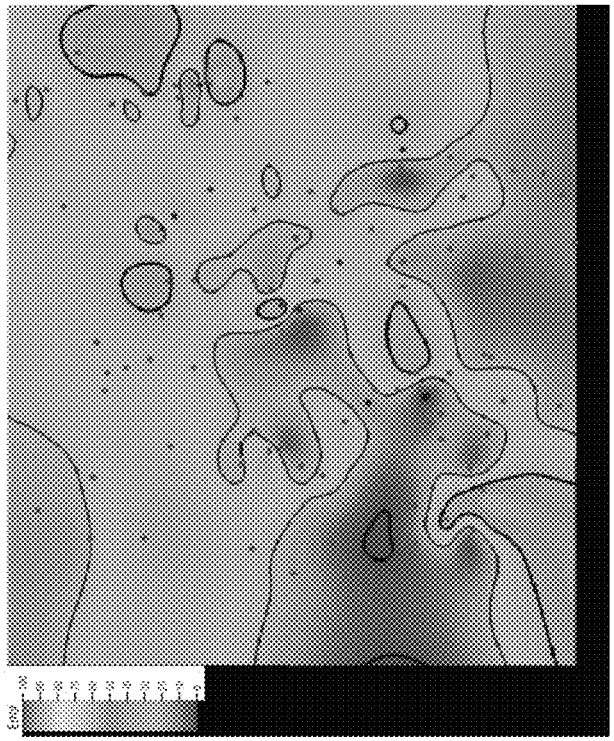
FIG. 6 is a diagram illustrating an example of a field-scale error contour map.

In FIG. 6, a diagram is provided which illustrates a field-scale error contour map across a heterogeneous, unconventional hydrocarbon-bearing region. The diagram indicates the difference between the log definitions of a particular rock class in the reference model and the corresponding log definitions at every well location. Such data may be processed by processor-based system 32 and output to a desired display medium 44 for evaluation.

The overall methodology further comprises core-scale heterogeneity characterization which may include the selection of samples for laboratory testing. Characterization of core-scale heterogeneity may be conducted by using continuous measurements of, for example, strength (which may be determined by a scratch test available from TerraTek, Inc. of Salt Lake City, Utah, USA, a Schlumberger company), thermal properties (which may be determined by a thermal scanner available from TerraTek, Inc.), mineralogy (which may be determined by an XRF scanner available from TerraTek, Inc.), digital imaging (which may be performed by a color scanner available from TerraTek, Inc.), x-ray tomography (which may be determined by CT scanning), or various combinations of these continuous measurements. Averaged values at a desired resolution, e.g. 1 inch (25.4 mm), are adequate for core-scale analysis. Sample locations may be selected by integrating the continuous measurements with photo overlays of core sections along the entire (or nonredundant) length of the core. Heterogeneous rock analysis may be performed on multiple sets of continuous core data following the same procedures and utilizing the same mathematics as employed for the regional-scale and the wellbore-scale HRA. The result is identification of higher resolution rock sub-classes that define the subsets of the rock classes defined at wellbore-scale.

Figure 7:
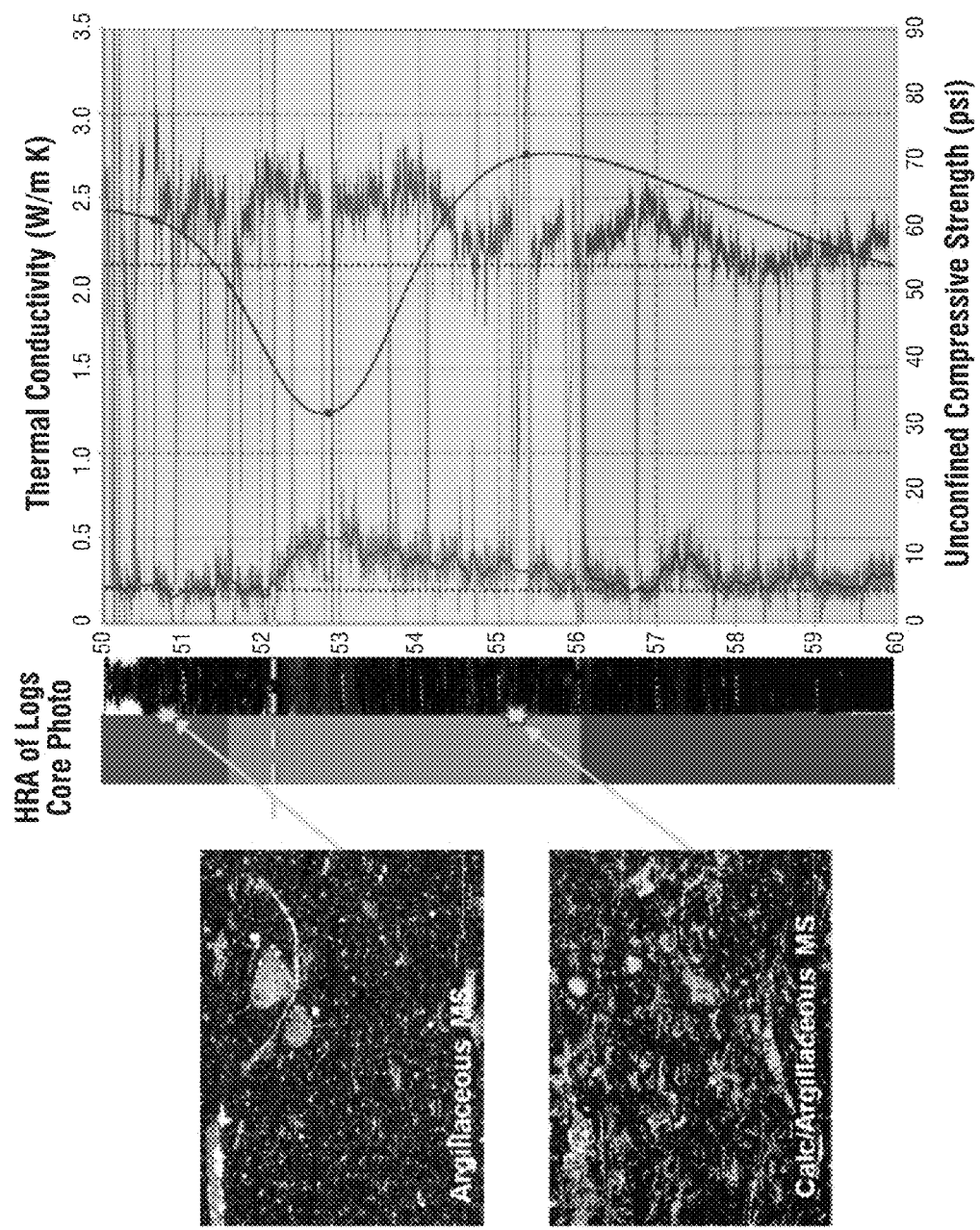
FIG. 7 is a diagram illustrating an example of a display output showing high-resolution measurements with respect to a core.

Thus, a rock class that is uniquely defined at wellbore-scale based on logs, and is considered to be homogeneous at this scale, is subsequently observed to be heterogeneous with higher resolution measurements. The rock class is broken down into rock sub-classes which are considered to be homogeneous at the core-scale resolution, as illustrated in the diagram of FIG. 7. The comparison of seismic-scale, wellbore-scale, and core-scale rock classifications generates a consistent set of rock classes and sub-classes which enables integration of properties across all of the scales. Additionally, the analysis and visualization of the multiple rock classes and their interrelationship across scales improves the core geologic analysis and facilitates its upscaling and the development of the regional-scale geologic model. The analysis is also extremely useful for calibration of log data at medium resolution to core data at fine resolution. For example, the analysis is useful with respect to integrations of elemental capture spectroscopy (ECS) mineralogy to core-scale mineralogy, and/or for integration of sonic scanner acoustic anisotropy to core-scale elastic anisotropy. Based on the rock classification results, sample selection may be conducted according to the methodology for characterizing core-scale heterogeneity outlined in the flowchart of FIG. 8.

Figure 8:
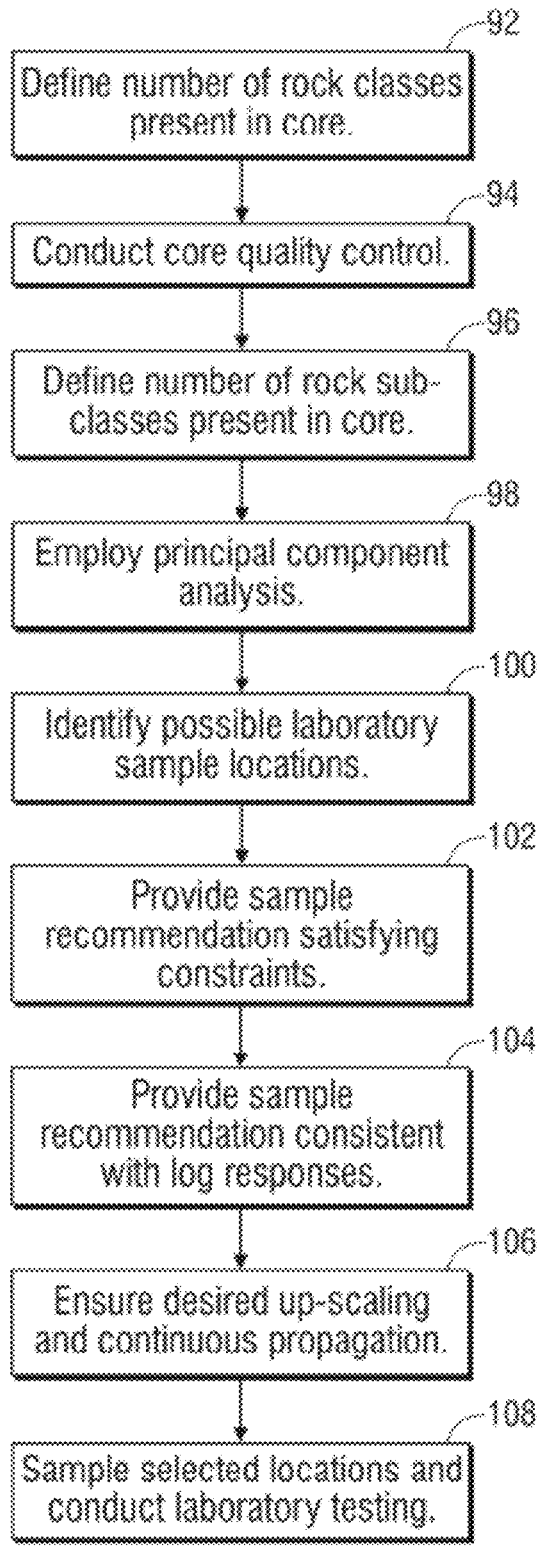
FIG. 8 is a flowchart illustrating a more detailed example of characterizing core-scale heterogeneity.

As illustrated in the example provided in FIG. 8, the well-scale HRA may be used initially to define the number of rock classes present the core in relation to the number of rock classes identified in a well section, as indicated by block 92. A core quality control is then conducted across all sections on a rock class by rock class basis, as indicated by block 94. The sampling recommendation may be updated on the basis of high quality core sections. The methodology for characterizing core-scale heterogeneity may also comprise defining the number of rock sub-classes present in the core, as indicated by block 96. The number of rock classes may be defined using core-scale HRA, and the methodology may include validating consistency between rock classes defined at wellbore-scale and rock classes defined at core-scale.

In this example, the methodology further comprises using principal component (PC) analysis and defining mean values and statistical distributions of all PC analysis values of the log measurements across each of the selected rock classes at wellbore scale, as indicated by block 98. Possible laboratory sample locations may be identified on the basis of selected criteria, as indicated by block 100. These criteria may include good core quality; reasonably thick and uniform core sections; location of samples at depths satisfying the mean values of all or most principal components; location of samples at depths representing the upper and lower quartiles of the PC distribution; location of samples at depths that satisfy any other desired range within the PC distribution, and strong correspondence between these sample locations and the rock sub-classes identified at higher resolution with continuous measurements taken along the length of the core. The collection of all possible samples satisfying a particular range in the PC distribution (for example the median values) provides a high level of redundancy such that equivalent sample locations can easily be identified. This type of analysis is also of high value for future sampling when, for example, measurements on identical samples are needed long after the initial laboratory testing is completed.

The methodology for characterizing core-scale heterogeneity may also include providing a sample recommendation that satisfies the constraints and objectives of the program, as illustrated by block 102. For comprehensive characterization, for example, all dominant rock sub-classes and all rock classes in the core may be sampled with sufficient degree of redundancy. However, for a program with limited sampling requirements, only the dominant rock classes (along sections that satisfy the median values of the PC values) may be sampled. The methodology may also include providing a sample recommendation that is consistent with the wellbore-scale log responses, as indicated by block 104. The provided sample recommendation is also generally consistent with the continuous core-scale measurements, consistent with the core geology, and adequate for meeting the regional rock characterization objectives on a regional-scale.

This quantitative procedure ensures the desired up-scaling and continuous propagation of depth-specific laboratory data to continuous core data, to continuous log data, and to continuous regional data (e.g., seismic), as indicated by block 106. The procedure also ensures proper association to measured data, including the statistical variability and scale representation of the data, to rock classes defined with logs and seismic data alone, across the region. Additionally, the methodology may include sampling the selected locations, conducting laboratory testing, and populating the rock classes with the measured data, as indicated by block 108.

Referring again to FIG. 7, the diagram provides an example of high resolution measurements on the core for evaluation of core-scale heterogeneity and HRA on the core. In this case, the high resolution measurements include continuous profiles of unconfined compressive strength and thermal conductivity. The continuous measurements further indicate the bulk correspondence to the log-scale classification, but also highlight the persistent variability within these log-derived classes. Integration of HRA at wellbore (log) and core-scale enables the determination of strong statistical representation during sampling and preserves the variability of properties at all scales. It should be noted that the diagram of FIG. 7 may be part of the graphical user interface automatically provided as a result of processing data on processor-based system 32 and output to a suitable display medium 44.

Figure 9:
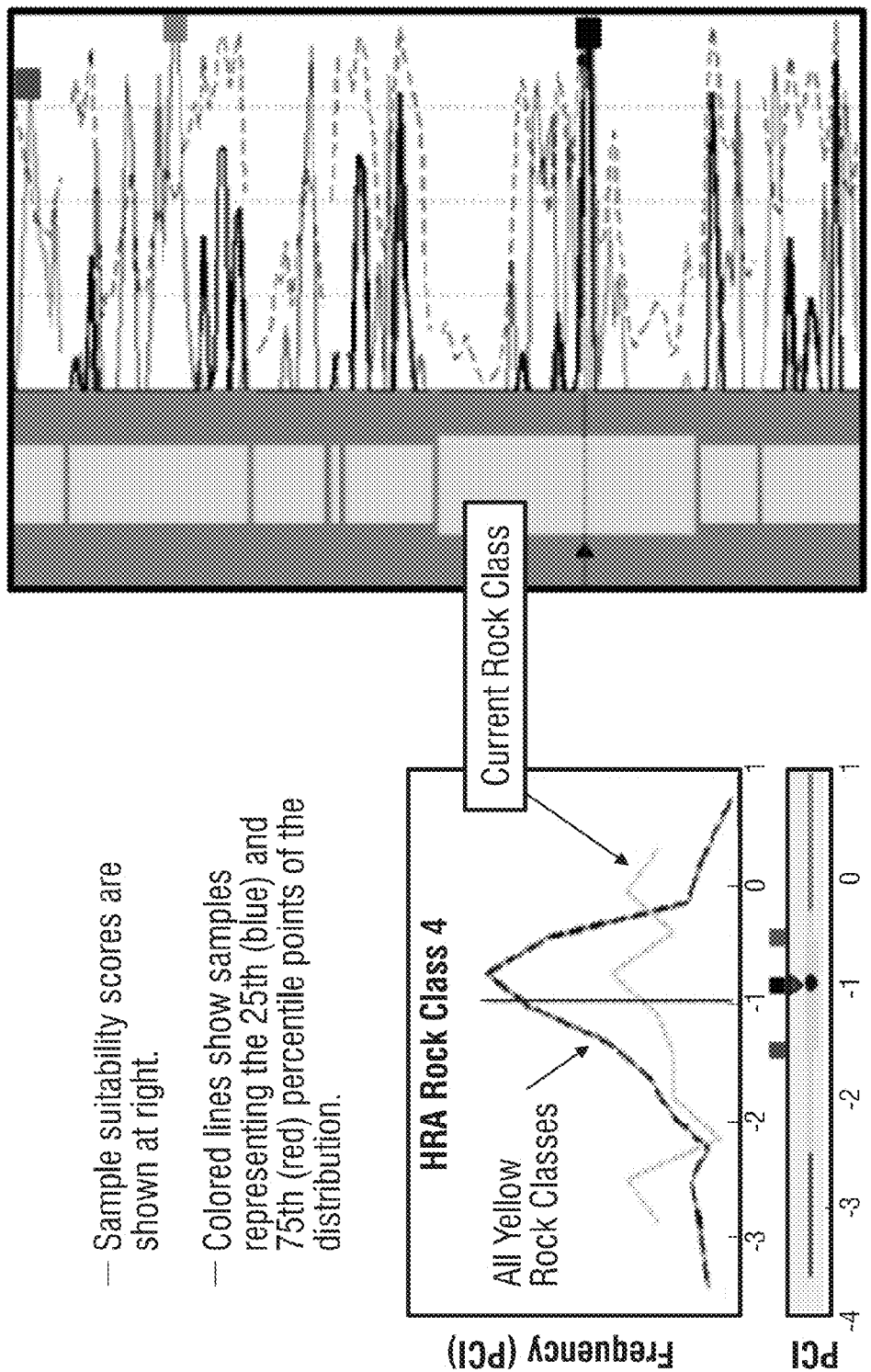
FIG. 9 is a diagram illustrating an example of a display output showing distribution of principal components of log measurements and sample selection based on these.
Figure 10:
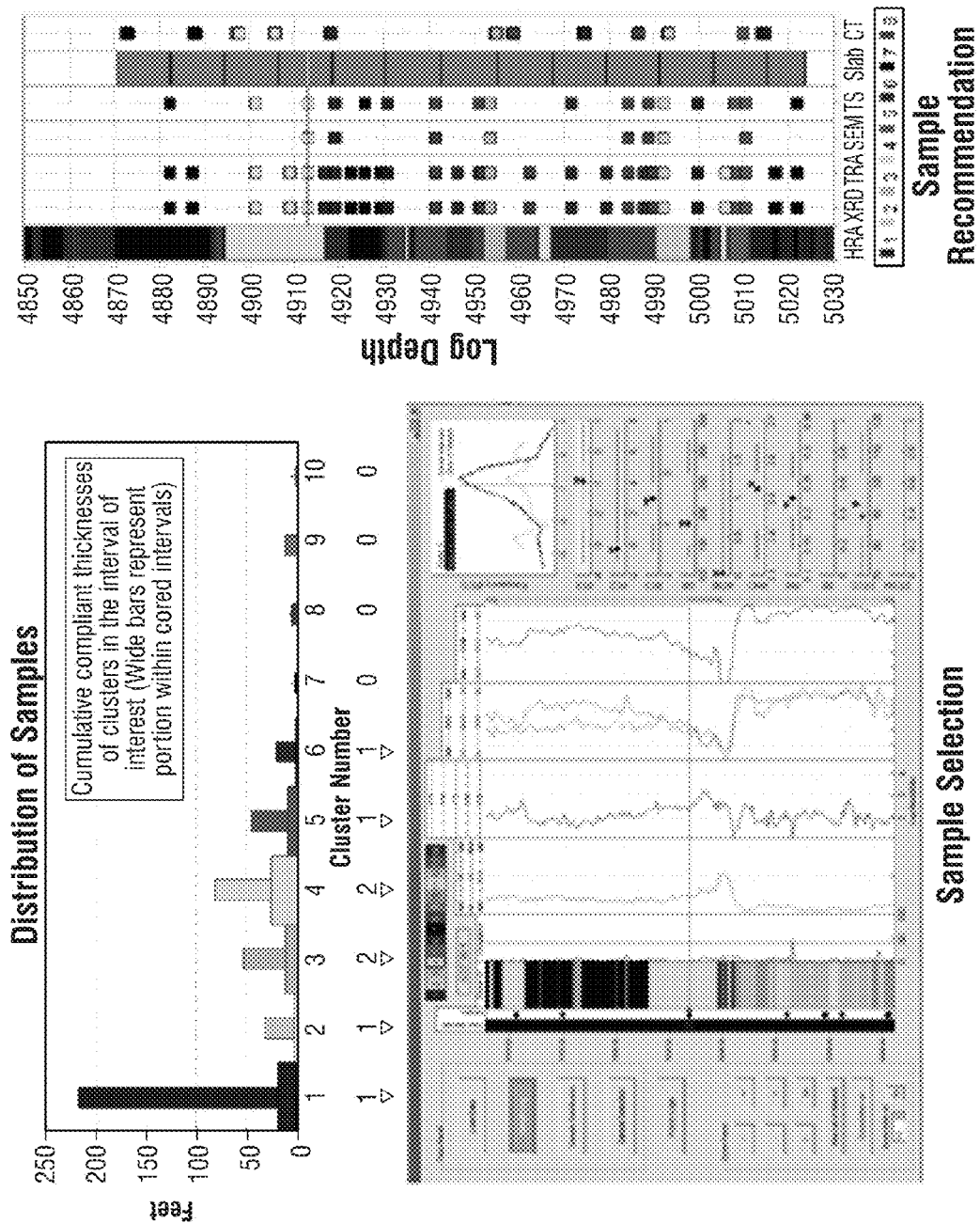
FIG. 10 is a diagram illustrating an example of a display output showing distribution of cored and un-cored rock classes, variability of log responses, and core sampling recommendation.

Additional examples of useful information which may be output by processor-based system 32 to a display medium 44 are illustrated in FIGS. 9 and 10. In FIG. 9, an example of a desirable display is output as defining the distribution of principal components (PC) of log measurements. The display also illustrates the associated selection of depth locations representing a mean value, a 25th percentile value, and a 75th percentile value of the distribution. The analysis displayed enables evaluation of the direct relationship between log response distributions and the laboratory samples that characterize it, while also identifying redundant locations for sampling.

In FIG. 10, an example of a desirable display is output showing additional results of the analysis. For example, the output illustrates the distribution of cored and un-cored rock classes in the upper left of the display. The information displayed in the lower left illustrates how each example represents variability of log responses. In this case, the selected sample represents the mean response of all the log measurements. Additional samples can be selected to represent the departure from the mean log response. Completion of the analysis is illustrated on the right side of the display and shows selected samples in relation to the HRA log analysis and the core.

The overall characterization methodology also comprises sample scale heterogeneity characterization which may include the selection of samples for small scale evaluation. Characterization of sample-scale heterogeneity may be conducted by using continuous measurements of, for example, strength (which may be determined by a TerraTek scratch test), thermal properties (which may be determined by a TerraTek thermal scanner), mineralogy (which may be determined by a TerraTek XRF scanner), digital imaging (which may be performed by a TerraTek color scanner), x-ray tomography (which may be determined by a CT scanner), or various combinations of these continuous measurements. Averaged values at a resolution of, for example, 1 mm are adequate for sample-scale analysis. Locations for focused ion beam (FIB) (Argon milling) images may be selected by integrating the continuous measurements of photo overlays with large scale thin sections or thin section mosaics showing the entire region of interest. Heterogeneous rock analysis may be performed on multiple sets of continuous core data following the same procedures and utilizing the same mathematics as employed for the regional-scale and the wellbore-scale HRA. The result is identification of small scale variability in material properties which are associated with subtle changes in matrix texture and composition.

The sample scale is a fundamental scale which defines the reservoir potential via various factors, e.g. via porosity, connectivity between pores, degree of compaction, mineral and organic carbon distribution, and other factors. Results of the analysis map regions of similar and dissimilar material properties and associate these regions with similar and dissimilar combinations of texture and composition. The results also provide an understanding of the small scale departures from the general behavior while also identifying dominant trends. Samples are selected for adequate characterization of the larger scale trends as well as to gain an understanding of the regions departing from these trends. This is the scale that defines how hydrocarbons are mobilized and produced as a result of micron-sized porosity, interconnectivity, and the surface forces associated with their organic and inorganic composition.

Figure 11:
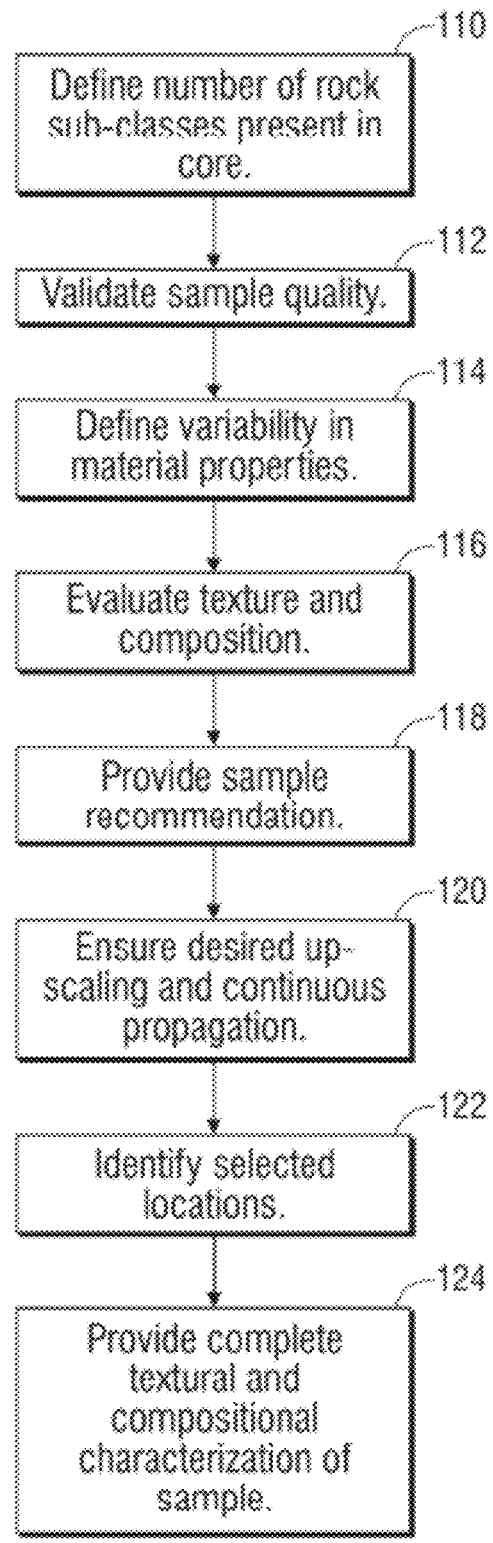
FIG. 11 is a flowchart illustrating a more detailed example of characterizing sample-scale heterogeneity.
Figure 12:
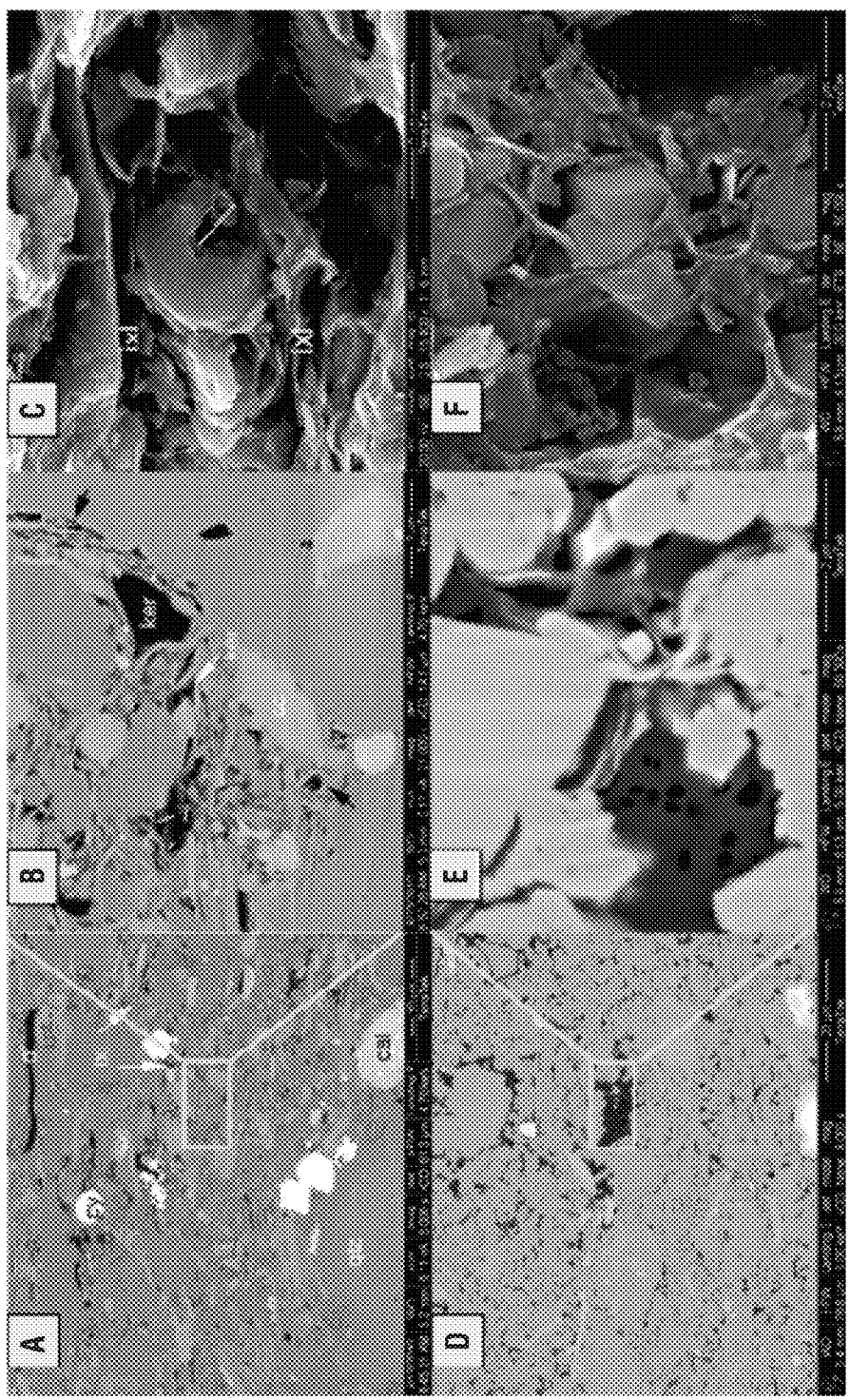
FIG. 12 is a diagram comparing two imaging methods for pore-scale rock characterization.

Referring generally to FIG. 11, an example of a specific methodology for accomplishing characterization of sample-scale heterogeneity is illustrated. In this example, the core-scale HRA may be used initially to define the number of rock sub-classes present in the core in relation to the number of rock sub-classes selected for testing, as indicated by block 110. The quality of the sample is then validated by, for example, visual inspection and x-ray tomography, as indicated by block 112. The variability in material properties is then defined, as indicated by block 114. By way of example, high resolution continuous measurements obtained at 10 to 100 points per millimeter and averaged at 1 mm or other suitable spacing, may be used to define the variability in material properties across the length of the sample.

Texture and composition may also be evaluated across the sample, as indicated by block 116. For example, selection of FIB samples may employ photo overlays of high resolution data and large scale thin sections, or thin section mosaics. The methodology for characterizing sample-scale heterogeneity may also comprise providing sampling recommendations, as indicated by block 118. The sample recommendation is consistent with the high resolution continuous measurements (taken at sample-scale) and with the large scale thin section images (taken at a small sample-scale). The sample recommendation is adequate for meeting the sub-class rock characterization objectives.

This quantitative procedure ensures the desired up-scaling and continuous propagation of pore-scale data to sample-scale data, as indicated by block 120. The procedure also ensures proper association to measured data, including the statistical variability at the pore-scale and scale representation of the data, with respect to rock sub-classes at the sample-scale. Additionally, the methodology may include identifying selected locations, as indicated by block 122, orienting the rock texture of the sample with the view direction normal to the sedimentary planes of bedding, and obtaining identical adjacent samples with one surface freshly broken and the other one ground flat (see FIG. 12). The rough sample may be imaged with a standard secondary electron SEM method covering the entire half of the cube sample. The opposite surface in the adjacent sample is polished using, for example, an argon ion milling method and imaged using, for example, a backscatter SEM method.

The dual imaging (e.g. imaging ultra-flat surfaces via FIB and conventional rough surfaces via SEM) helps provide a complete textural and compositional characterization of the sample, as indicated by block 124. The sample characterization may include sub-millimeter scale textural information with surface relief, energy dispersive x-ray (EDX) mineralogy for individual crystals, crystal morphology, and morphology of organic particles. The sample characterization may also utilize a flat surface, with no relief, which is suitable for better quantification of pore geometries, mineral-mineral boundaries, and mineral-kerogen boundaries. The methodology also results in better visualization of organic matter due to its density contrast with mineral components. Also, considerable improvement in the interpretation of the images is enabled through comparison of the two visualizations provided by this methodology.

Referring again to FIG. 12, the figure illustrates the benefits of comparing two imaging methods for pore-scale rock characterization. In this particular example, the top row of the figure illustrates calcareous shale in the form of a textural overview (A), an FIB detail of the pore system showing the predominance of intercrystalline pores (B), and a standard SEM image (C) at approximately the same scale as B but showing flattened voids between clays and intercrystalline pores as in B. The geometry of the mineral boundaries is highlighted by the FIB illustration. In this example, the bottom row of the figure illustrates siliceous shale in the form of a textural overview (D), an FIB image emphasizing organic porosity within dark kerogen mass (E), and a standard SEM image of the adjacent sample, at approximately the same scale, showing rough, spongy kerogen morphology and organic pores (F).

The overall methodology further comprises integration of results across scales. With this methodology, integration of data across scales is greatly facilitated by a "boxes within a box" structure of lower resolution rock types containing higher resolution sub-rock types across various scales. Each of these levels is associated with material property distributions rather than material property averages. A rock class is defined as a homogeneous unit at the scale at which it is defined. However, the same rock class is heterogeneous at a higher resolution. The rock class variability in measured properties, e.g. continuous strength, semi-continuous porosity, permeability, and/or other properties, is represented by statistical distributions, e.g. box and whisker plots.

As a result, even when populating data along the lowest resolution rock classes (regional-scale), the statistical variability of these properties in the presence of sub-classes within each rock class is well understood. The present methodology thus enables scaling of data upwards and downwards without loss of relevant information. For convenience, the relevant reference scale for regional-scale analysis may be defined as the wellbore (log)-scale. Consequently, the methodology may be focused on obtaining effective sampling and effective representation of all rock classes defined at wellbore-scale.

A principal source of directly measured material properties is the core. The present sampling methodology addresses the integration of core data and log data and seismic data by systematic identification of homogeneous rock classes at different scales and by adequate sampling and laboratory testing along these scales. Higher resolution scales (pore-scale and sample-scale) add relevant details to the characterization which improves the understanding of the system. In tight shales and related mudstones regions, for example, the microscale texture and composition define the properties most relevant to reservoir production, e.g. porosity, permeability, and/or saturations. However, the distribution of these values along a much larger scale (wellbore and regional-scales) defines the actual production potential.

Figure 13:
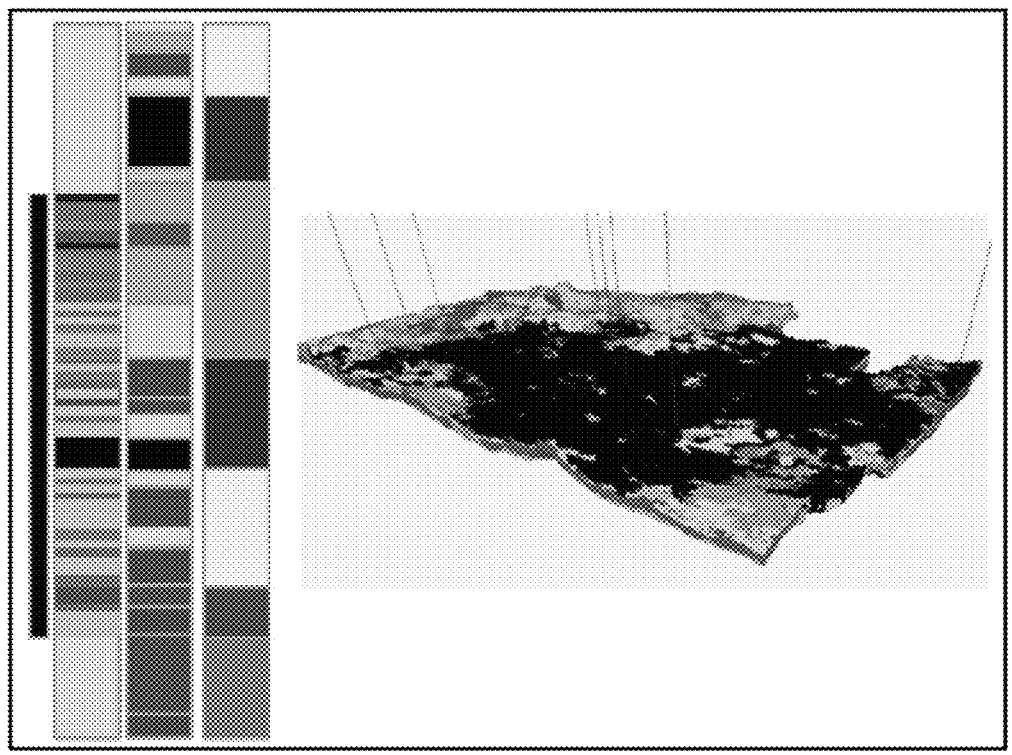
FIG. 13 is a diagram illustrating an example of heterogeneous rock analysis with respect to rock class determination at different scales.

Furthermore, the lower resolution seismic-scale defines the actual volumetric distribution of these and other diagenetic facies, thus allowing a better understanding of the geology, the reserve estimates, and the net value of the hydrocarbon play. As discussed earlier, understanding heterogeneous plays is complicated, and an attribute of the present methodology for substantially increasing the relevant knowledge and understanding of these plays is methodic and efficient sampling. Accordingly, the present strategy and methodology provides recommendations for sampling across multiple scales to properly characterize heterogeneous, e.g. tight shale, hydrocarbon plays. The added knowledge gained by the present methodology may be output to an appropriate display medium, e.g. computer screen, in a variety of formats. In FIG. 13, for example, an example of HRA analysis for rock class determination at different scales is illustrated as a possible output to facilitate understanding of the hydrocarbon play. The information output includes core-scale, wellbore-scale, up-scaled wellbore-scale, and seismic-scale data, although many other types, arrangements, and amounts of information may be displayed.

The overall methodology also comprises the propagation of data across multiple scales with respect to heterogeneous regions. Propagation of data across heterogeneous plays is normally problematic because of the lack of lateral continuity along a single lithologic unit and because of changes in properties as a function of scale. However, the present methodology provides a simple solution to these problems which does not require assumptions regarding lateral continuity. The present methodology defines the real lateral variability based on measurable regional and wellbore-scale data. In addition, the present methodology preserves the distribution for variability in properties across scales which allow a user to define different averaged properties at different scales.

The present method may also comprise making data consistent across multiple scales and integrating the data into a single model, such as a Heterogeneous Earth Model (HEM). The HEM is then used to evaluate regions with various degrees of reservoir and completion quality. Analysis of these results enables the identification of locations with coinciding conditions of good reservoir quality (RQ) and good completion quality (CQ), thus representing easy targets. Alternatively, the results facilitate identification of challenging regions with good reservoir quality but poor completion quality. The results may also be used to identify regions having poor reservoir quality with poor to no potential.

Figure 14:
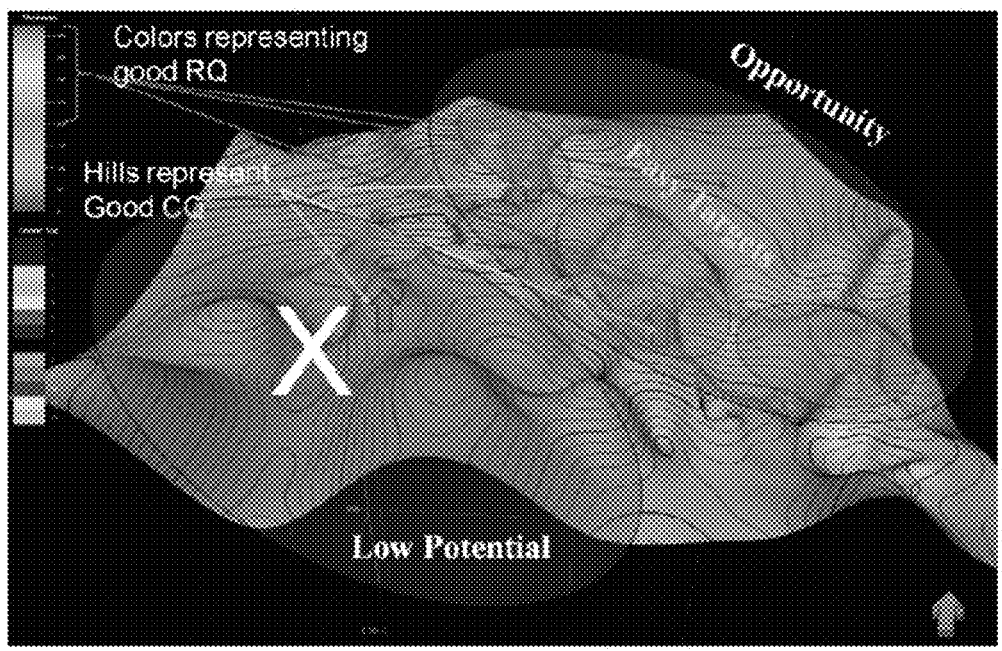
FIG. 14 is a diagram illustrating an example of a display output showing regional-scale distribution of regions having a high potential for desirable hydrocarbon content.

The results may be output to, for example, display medium 44, in numerous forms and with a variety of content. FIG. 14 provides one illustration of an output which helps define the regional-scale distribution of regions of high potential (easy targets). The information output may also include technically challenging regions, e.g. regions requiring engineering and technical know-how, and low potential regions having poor reservoir quality. Early identification of these conditions enables development of a strong strategy for appraisal, exploration, and production with respect to a given hydrocarbon-bearing region. The methodology and information output also facilitates the effective deployment of resources. As described above, sampling selection is an important component of the regional-scale characterization, and the validity of analysis depends strongly on the adequacy of the sample representation. As described herein, the present methodology provides a strong tool for the effective sampling and characterization of heterogeneous, unconventional hydrocarbon regions.

Accordingly, although only a few embodiments of the present invention have been described in detail above, those of ordinary skill in the art will readily appreciate that many modifications are possible without materially departing from the teachings of this invention. Such modifications are intended to be included within the scope of this invention as defined in the claims.

What is claimed is:

1. A method for sampling and characterizing a heterogeneous, unconventional hydrocarbon-bearing region, comprising:
    characterizing regional-scale heterogeneity to assess pilot well locations;
    characterizing wellbore-scale heterogeneity to facilitate selection of core sections and core depths;
    characterizing core-scale heterogeneity and defining rock sub-classses;
    characterizing sample-scale heterogeneity for selection of small samples or fragments to undergo small scale evaluation;

integrating results across scales based on results obtained from characterizing regional, wellbore, core, and sample heterogeneity; and determining data propagation across multiple scales in the hydrocarbon-bearing region.

2. The method as recited in claim 1, further comprising outputting information on the data propagation to a display medium.

3. The method as recited in claim 2, wherein integrating and determining are performed on a processor-based system coupled with the display medium.

4. The method as recited in claim 3, wherein characterizing regional-scale heterogeneity comprises quality checking seismic data and well log data.

5. The method as recited in claim 3, wherein characterizing regional-scale heterogeneity comprises performing heterogeneous rock analysis and Heterogeneous Earth Modeling techniques.

6. The method as recited in claim 3, wherein characterizing regional-scale heterogeneity comprises using Extrema Surfaces algorithms on the processor-based system to define lateral extent and continuity of rock classes.

7. The method as recited in claim 3, wherein characterizing wellbore-scale heterogeneity comprises conducting heterogeneous rock analysis on well log data.

8. The method as recited in claim 7, wherein characterizing wellbore-scale heterogeneity further comprises defining the number of rock classes present.

9. The method as recited in claim 7, wherein characterizing wellbore-scale heterogeneity further comprises determining core sections and core lengths to maximize representation of various rock classes.

10. The method as recited in claim 7, wherein characterizing wellbore-scale heterogeneity further comprises assessing core quality along various rock class sections.

11. The method as recited in claim 3, wherein characterizing core-scale heterogeneity comprises utilizing heterogeneous rock analysis to define rock sub-classes in the core and validating consistency between rock classes.

12. The method as recited in claim 11, wherein characterizing core-scale heterogeneity further comprises employing principal component analysis and defining statistical distributions of principal component analysis of log measurements across each of selected rock classes, and using this information to define the sampling requirements and precise sample locations, including the necessary redundancy.

13. The method as recited in claim 3, wherein characterizing sample-scale heterogeneity comprises using core-scale heterogeneous rock analysis to define the number of rock sub-classes present in the core relative to the rock sub-classes selected for testing.

14. The method as recited in claim 13, wherein characterizing sample-scale heterogeneity comprises performing high resolution continuous measurements to define variability in material properties along the length of a sample.

15. A method of sampling and characterizing a heterogeneous, unconventional hydrocarbon-bearing region, comprising:

defining lateral variability of a subterranean region based on measurable regional and wellbore-scale data;

preserving the distribution and variability in properties across scales to facilitate definition of different averaged properties at different scales;

rendering the data consistent across multiple scales and integrating the data into a single Heterogeneous Earth Model; and using the Heterogeneous Earth Model to evaluate a subterranean region with various degrees of reservoir and completion quality.

16. The method as recited in claim 15, wherein rendering the data consistent across multiple scales and integrating the data into a single Heterogeneous Earth Model comprises integrating the data into the Heterogeneous Earth Model on a processor-based system.

17. The method as recited in claim 16, wherein the defining, preserving, rendering, and using steps are each carried out at least in part on the processor-based system.

18. The method as recited in claim 17, further comprising outputting results to a display medium.

* * * * *